United States Patent
Dawson et al.

(10) Patent No.: US 9,563,447 B2
(45) Date of Patent: *Feb. 7, 2017

(54) SHARING OF CLASSES FOR MODULAR PROGRAMS IN A MULTI-TENANT ENVIRONMENT

(71) Applicant: International Business Machines Corporation, Armonk, NY (US)

(72) Inventors: Michael H. Dawson, Ottawa (CA); Bentley J. Hargrave, Deland, FL (US); Thomas J. Watson, Pflugerville, TX (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/081,020

(22) Filed: Mar. 25, 2016

(65) Prior Publication Data

US 2016/0274924 A1 Sep. 22, 2016

Related U.S. Application Data

(63) Continuation of application No. 14/921,183, filed on Oct. 23, 2015, now Pat. No. 9,311,118, which is a
(Continued)

(51) Int. Cl.
*G06F 9/44* (2006.01)
*G06F 9/445* (2006.01)

(52) U.S. Cl.
CPC ................. *G06F 9/44521* (2013.01)

(58) Field of Classification Search
None
See application file for complete search history.

(56) References Cited

U.S. PATENT DOCUMENTS 7,437,718 B2   10/2008   Fournet et al.
7,533,389 B2   5/2009    Verbeke et al.
(Continued)

OTHER PUBLICATIONS

Daynes, L. et al., "Sharing the Runtime Representation of Classes across Class Loaders," In ECOOP 2005—Object-Oriented Programming, Lecture Notes in Computer Science, vol. 3586, pp. 97-120, Jul. 2005, [retrieved Jan. 16, 2015], retrieved from the Internet: <http://link.springer.com/chapter/10.1007/11531142_5>, 5 pg.

(Continued)

*Primary Examiner* — Insun Kang
(74) *Attorney, Agent, or Firm* — Cuenot, Forsythe & Kim, LLC

(57) ABSTRACT

For each of a plurality of different tenants configured to concurrently execute in a virtual environment, a respective class loader graph can be constructed. For each respective class loader graph, unique types of edges between nodes that affect class loading can be identified. The edges can be traversed. Based on traversing the edges of the class loader graph, a respective unique dependency identifier (UDI) can be assigned to each class loader request. Class loader requests that are assigned the same UDI can be identified in at least two of the tenants. Responsive to identifying the class loader requests that are assigned the same UDI, a shared class loader can be assigned to each of the class loader requests. Each respective class loader request that is assigned the same UDI can be configured to call the shared class loader to load at least one class required by the respective tenant.

7 Claims, 4 Drawing Sheets

Related U.S. Application Data continuation of application No. 14/659,054, filed on Mar. 16, 2015, now Pat. No. 9,292,315.

(56) References Cited

U.S. PATENT DOCUMENTS

| | | | |
|---|---|---|---|
| 7,836,440 B2* | 11/2010 | Blackman | G06F 8/433 707/695 |
| 7,840,967 B1 | 11/2010 | Czajkowski et al. | |
| 8,966,464 B1 | 2/2015 | Christopher et al. | |
| 8,997,075 B2* | 3/2015 | Eliaš | G06F 9/44521 717/166 |
| 8,997,089 B2* | 3/2015 | Brannen, Jr. | G06F 8/61 717/174 |
| 9,075,640 B1 | 7/2015 | O'Neill et al. | |
| 9,292,315 B1 | 3/2016 | Dawson et al. | |
| 9,311,118 B1 | 4/2016 | Dawson et al. | |
| 2006/0070051 A1 | 3/2006 | Kuck et al. | |
| 2007/0006203 A1 | 1/2007 | Marwinski | |
| 2007/0061798 A1 | 3/2007 | Atsatt | |
| 2007/0169072 A1 | 7/2007 | Corrie | |
| 2007/0256069 A1 | 11/2007 | Blackman et al. | |
| 2008/0134138 A1 | 6/2008 | Chamieh et al. | |
| 2009/0276767 A1* | 11/2009 | Brannen, Jr. | G06F 8/61 717/166 |
| 2009/0276769 A1 | 11/2009 | Brannen, Jr. et al. | |
| 2012/0266149 A1 | 10/2012 | Lebert | |
| 2013/0138703 A1 | 5/2013 | Daynes et al. | |
| 2014/0157231 A1 | 6/2014 | Cai et al. | |
| 2015/0032789 A1 | 1/2015 | Nguyen et al. | |
| 2015/0033215 A1 | 1/2015 | Elias et al. | |
| 2015/0268976 A1* | 9/2015 | O'Neill | G06F 9/45504 717/148 |
| 2015/0309777 A1* | 10/2015 | Salnikov-Tarnovski | G06F 9/45504 717/157 |

OTHER PUBLICATIONS

Paal, S.. et al., "Java Class Separation for Multi-Application Hosting," In Proc. of 3rd Conf. on Internet Computing (IC 2002), pp. 259-266, 2002.

"OSGi Core Release 6," OSGi Alliance, Jun. 2014, OSGi Alliance © 2000, 2014, 450 pg.

"Multitenancy Feature," [online] IBM SDK, Java Technology Edition, Version 7, Release 1, IBM Knowledge Center, copyright IBM Corporation 2005, 2015, retrieved Mar. 16, 2015, retrieved from the Internet: <http://www-01.ibm.com/support/knowledgecenter/SSYKE2_7.0.0/com.ibm.java.aix.71.doc/diag/understanding/mt_intro.html?>, 2 pg.

"Traditional JVM Process Model," [online] IBM SDK, Java Technology Edition, Version 7, Release 1, IBM Knowledge Center, Copyright IBM Corporation 2005, 2015, retrieved Nov. 21, 2014, retrieved from the Internet: <SSYKE2_7.0.0/com.ibm.java.aix.71.doc/diag/understanding/mt_intro_traditional.html>, 1 pg.

"Configuring a Multitenant JVM," [online] IBM SDK, Java Technology Edition, Version 7, Release 1, IBM Knowledge Center, Copyright IBM Corporation 2005, 2015, retrieved Nov. 21, 2014, retrieved from the Internet: <http://www-01.bm.com/support/knowledgecenter/SSYKE2_7.0.0/com.ibm.java.win.71.doc/user/mt_configure_rcm.html>, 3 pg.

"Command-line Options for Multitenancy," [online] IBM SDK, Java Technology Edition, Version 7, Release 1, IBM Knowledge Center, Copyright IBM Corporation 2005, 2015, retrieved Nov. 21, 2014, retrieved from the Internet: <http://www-01.ibm.com/support/knowledgecenter/SSYKE2_7.0.0/com.ibm.java.win.71.doc/user/mt_commands.html>, 3 pg.

"Known Issues and Limitations," [online] IBM SDK, Java Technology Edition, Version 7, Release 1, IBM Knowledge Center, Copyright IBM Corporation 2005, 2015, retrieved Nov. 21, 2014, retrieved from the Internet: <http://www01.ibm.com/support/knowledgecenter/api/content/nl/enus/ SSYKE2_7.0.0/com.ibm.java.aix.71.doc/user/mt_limitations.html>, 2 pg.

"Running Tenant Applications," [online] IBM SDK, Java Technology Edition, Version 7, Release 1, IBM Knowledge Center, Copyright IBM Corporation 2005, 2015, retrieved Nov. 21, 2014, retrieved from the Internet: <http://www01.ibm.com/support/knowledgecenter/api/content/nl/enus/ SSYKE2_7.0.0/com.ibm.java.aix.71.doc/user/mt_using.html>, 2 pg.

Chen, R., "Key Features and Limitations," [online] IBM DeveloperWorks, Multitenant JVM Community, Jun. 26, 2014, Copyright IBM Corporation 2005, 2015, retrieved Nov. 21, 2014, retrieved from the Internet: <https://www.ibm.com/developerworks/community/wikis/home?lang=en#!/wiki/W38097c0d6679_4e9f_8be2_ca09c36d5e6d/page/Key%20Features%20and%20Limitations>, 2 pg.

Rolleston, G., "Multitenant JVM Quick Start," [online] IBM DeveloperWorks, Multitenant JVM Community, Jun. 6, 2014, Copyright IBM Corporation 2005, 2015, retrieved Nov. 21, 2014, retrieved from the Internet: <https://www.ibm.com/developerworks/community/wikis/home?lang=en#!/wiki/W38097c0d6679_4e9f_8be2_ca09c36d5e6d/page/Multitenant%20JVM%20Quick%E2%80%A6>, 2 pg.

Grace Period Disclosure: Watson, T., "Equinox Framework: A Happier OSGi R4 Implementation," Mar. 18, 2014, 61 pg., EclipseCon 2014, San Francisco, CA (Mar. 18, 2014) (slide presentation), The Eclipse Foundation, IBM corporation © 2014.

Grace Period Disclosure: Watson, T., "How Dense is the Cloud of OSGI," Mar. 20, 2014, 46 pg., EclipseCon 2014, San Francisco, CA (Mar. 20, 2014) (slide presentation), The Eclipse Foundation, IBM Corporation © 2014.

"Multitenant JVM Community," [online] IBM DeveloperWorks, Multitenant JVM Community, Jun. 6, 2014, Copyright IBM Corporation 2005, 2015, retrieved Mar. 16, 2015, retrieved from the Internet: <https://www.ibm.com/developerworks/community/groups/service/html/communityview?communityUuid=aa61d6e5-75c1-4a61-b88c-6ec8d80c49c7>, 2 pg.

"Multitenant JVM Process Model" [online] IBM SDK, Java Technology Edition, Version 7, Release 1, IBM Knowledge Center, Copyright IBM Corporation 2005, 2015, retrieved Nov. 21, 2014, retrieved from the Internet: <http://www-01.ibm.com/support/knowledgecenter/SSYKE2_7.0.0/com.ibm.java.aix.71.doc/diag/understanding/mt_intro_multitenant.html>, 2 pg.

IBM: Lists of IBM Patents or Patent Applications Treated as Related, 2 pg.

Dawson, M.H.. et al., "Sharing of Classes for Modular Programs in a Multi-Tenant Environment," U.S. Appl. No. 14/659,054, filed Mar. 16, 2015, 32 pages.

Dawson, M.H.. et al., "Sharing of Classes for Modular Programs in a Multi-Tenant Environment," U.S. Appl. No. 14/921,183, filed Oct. 23, 2015, 32 pages.

Dawson, M.H.. et al., "Sharing of Classes for Modular Programs in a Multi-Tenant Environment," U.S. Appl. No. 15/064,205, filed Mar. 8, 2016, 32 pages.

* cited by examiner

400

For each of a plurality of different tenants configured to concurrently execute in a virtual environment, construct in memory of a processing system a respective class loader graph comprising a plurality of nodes, each node representing a respective class loader request specified by a module of the tenant
402

For each respective class loader graph, identify unique types of edges between nodes that affect class loading, wherein each edge extends from a respective first node to a respective second node and indicates a dependency of the class loader request represented by the first node on the class loader request represented by the second node, traverse the edges in the class loader graph in accordance with data associated with each node and, based on traversing the edges of the class loader graph, assign a unique dependency identifier to each class loader request represented by a corresponding node, wherein the respective unique dependency identifier assigned to a class loader request that is dependent on at least one other class loader request is based, at least in part, on a respective type of at least one edge extending from the first node representing the class loader request to the second node representing the other class loader request
404

Identify, in at least two of the plurality of tenants, class loader requests that are assigned the same UDI
406

Responsive to identifying the class loader requests that are assigned the same UDI, assign, using a processor, a shared class loader to each of the class loader requests
408

Configure each respective class loader request that is assigned the same UDI to call the shared class loader to load at least one class required by the respective tenant
410

FIG. 4

US 9,563,447 B2

SHARING OF CLASSES FOR MODULAR PROGRAMS IN A MULTI-TENANT ENVIRONMENT

STATEMENT REGARDING PRIOR DISCLOSURES BY THE INVENTOR OR A JOINT INVENTOR

The following disclosures are submitted under 35 U.S.C. 102(b)(1)(A):

Tom Watson, *Equinox Framework: A Happier OSGi R6 Implementation*, EclipseCon 2014, San Francisco, Calif. (Mar. 18, 2014) (slide presentation), and Tom Watson, *How Dense is the Cloud of OSGI*, EclipseCon 2014, San Francisco, Calif. (Mar. 20, 2014) (slide presentation).

BACKGROUND

The present invention relates to the execution of workloads in a virtualized computing environment.

Heavily virtualized computing environments, for example cloud computing environments, are designed to realize cost savings by maximizing the number of workloads (e.g., programs) that are run per unit of hardware. This improves utilization rates of the hardware and energy efficiency by reducing, if not eliminating, idle time on hardware resources. Moreover, the total number of hardware resources deployed to handle the workloads is less than the number which would otherwise be deployed without the use of virtualization.

Workloads often times are written in Java™. Java™ is a general-purpose object-oriented computer programming language specifically designed to have as few implementation dependencies as possible. This allows application developers to write applications that can be run on any Java Virtual Machine (JVM), regardless of the computer architecture on which the applications are run. In this regard, a JVM provides an abstraction layer between the actual hardware and Java™ applications, imitating dedicated hardware. More particularly, a JVM interprets compiled Java™ binary code, called bytecode, for a computer's processor so that the processor can execute the bytecode, even though the bytecode is not specifically configured for the hardware on which it is executed. Thus, Java™ applications are portable, meaning that they can be executed on any type of computer architecture on which a JVM is executing.

SUMMARY

A method includes, for each of a plurality of different tenants configured to concurrently execute in a virtual environment, constructing in a memory of a processing system a respective class loader graph comprising a plurality of nodes, each node representing a respective class loader request specified by a module of the tenant. The method also can include, for each respective class loader graph, identifying unique types of edges between nodes that affect class loading, wherein each edge indicates a dependency of the class loader request represented by a first node on the class loader request represented by a second node, traversing the edges in the class loader graph in accordance with data associated with each node and, based on traversing the edges of the class loader graph, assigning a unique dependency identifier to each class loader request represented by a corresponding node. The method also can include identifying, in at least two of the plurality of tenants, class loader requests that are assigned the same unique dependency identifier. The method also can include, responsive to identifying the class loader requests to which the same unique dependency identifier is assigned, assigning a shared class loader to each of the class loader requests. The method also can include configuring each respective class loader request to which the same unique dependency.

BRIEF DESCRIPTION OF THE DRAWINGS

FIG. 4 is a flow chart illustrating an example of a method of sharing of classes for tenants executing in a multi-tenant virtual environment.

DETAILED DESCRIPTION

Figure 1:
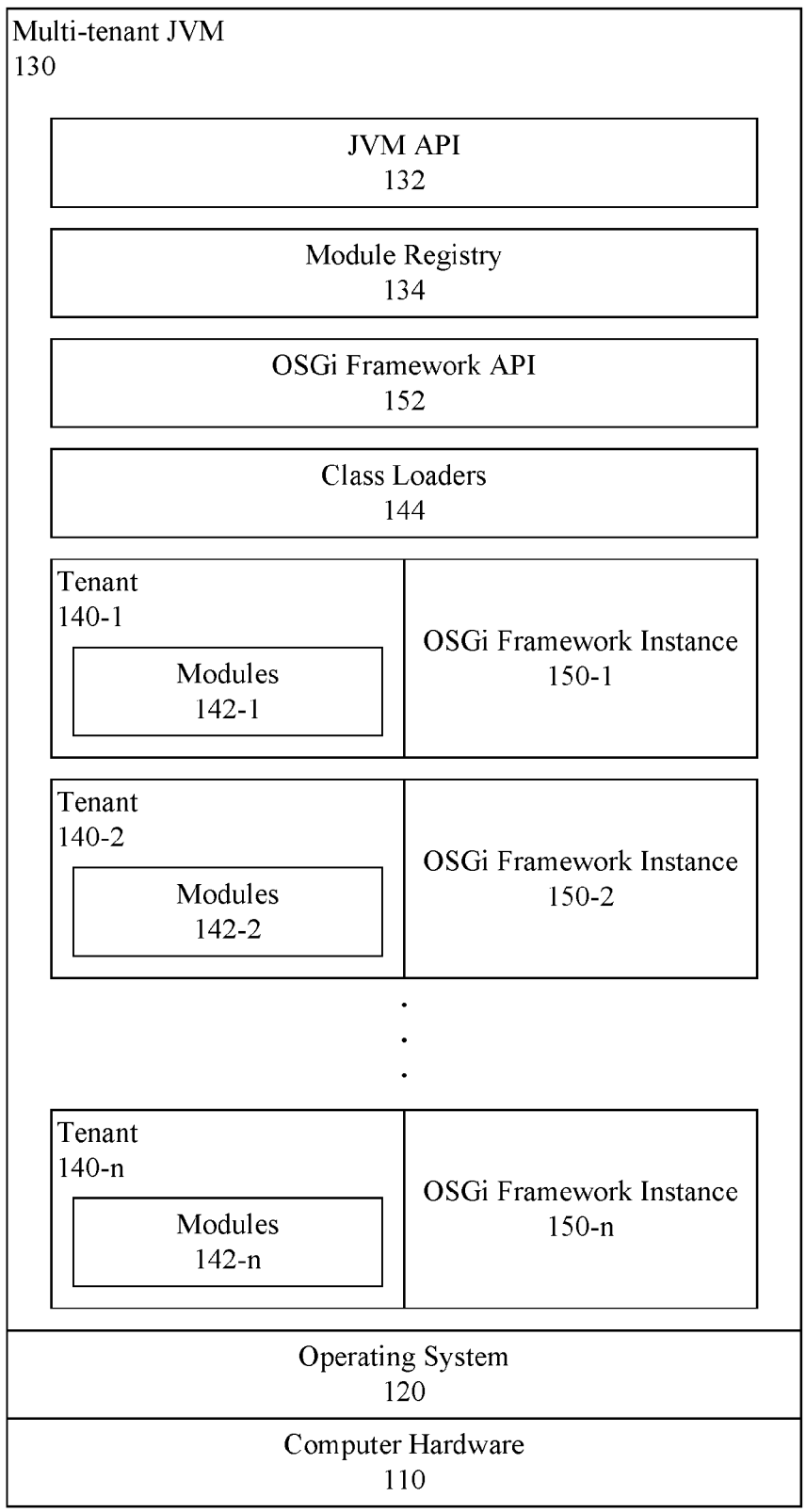
FIG. 1 is a block diagram illustrating example architecture for a system that hosts a multi-tenant virtual environment.

While the disclosure concludes with claims defining novel features, it is believed that the various features described herein will be better understood from a consideration of the description in conjunction with the drawings. The process(es), machine(s), manufacture(s) and any variations thereof described within this disclosure are provided for purposes of illustration. Any specific structural and functional details described are not to be interpreted as limiting, but merely as a basis for the claims and as a representative basis for teaching one skilled in the art to variously employ the features described in virtually any appropriately detailed structure. Further, the terms and phrases used within this disclosure are not intended to be limiting, but rather to provide an understandable description of the features described.

The present invention relates to the execution of workloads in a virtualized computing environment. More particularly, arrangements described herein relate to sharing of classes for modular programs in a multi-tenant virtual environment. In accordance with the inventive arrangements disclosed herein, a shared class loader can be created or selected for use by a plurality of different computer programs, referred to as tenants, running concurrently in the same virtual environment (e.g., running on the same Java Virtual Machine). Using the shared class loader, a single copy of a class can be shared across multiple tenants, with each tenant having its own copy of writeable static fields. The classes that are shared can be classes loaded by a bootstrap and extension class loaders, middleware classes and application classes. The sharing of classes improves resource utilization in a processing system. For example, memory is used more efficiently. Thus, less memory is required to store and execute program code. Moreover, startup time for tenants using shared classes is greatly improved.

In programs that use a complex and dynamic class loader hierarchy, such as programs based on an Open Service Gateway initiative (OSGi) framework, implementing the sharing of classes is difficult. The arrangements described herein overcome the technical challenges and extend the sharing of classes to such programs, thereby further extending resource utilization improvement in the processing system.

Several definitions that apply throughout this document now will be presented.

As defined herein, the term "virtual environment" means a software execution environment that is hosted by a virtual machine on at least one processing system. One example of a virtual machine is a Java™ Virtual Machine (JVM).

As defined herein, the term "multi-tenant environment" means a virtual environment in which a plurality of different tenants are concurrently hosted.

As defined herein, the term "tenant" means a modular program hosted in a multi-tenant environment that runs in the multi-tenant environment concurrently with, but independent of, one or more other modular programs. In other words, two tenants hosted in a multi-tenant environment can be completely different applications or services unrelated to one another other than they are hosted in the same multi-tenant environment and they may share classes and class loaders as described herein.

As defined herein, the term "modular program" means a computer program comprising a plurality of modules. An OSGi bundle is an example of a module.

As defined herein, the term "bundle" means a set of one or more classes, class related resources, and services that give the class(es) specific behaviors. For example, a bundle can be a Java Archive with extra manifest headers.

As defined herein, the term "class loader" means a software element that dynamically loads a bundle of one or more classes into a virtual machine for use by a computer program executing in a virtual environment.

As defined herein, the term "shared class loader" means a software element that dynamically loads a bundle of one or more classes into a virtual machine for use by a plurality of computer programs executing in a virtual environment.

As defined herein, the term "class loader request" means program code configured to be processed to send a request to a software component, such as an application program interface, to call a class loader to load one or more classes.

As defined herein, the term "class loader graph" means a representation, constructed in memory of a processing system, of class loading operations performed to load into a virtual machine classes used by a computer program. A class loader graph comprises a plurality of nodes associated with and/or representing the class loading operations.

As defined herein, the term "edge" means a path from a node of a class loader graph directly to another node of the class loader graph.

As defined herein, the term "unique node identifier" means an identifier assigned to a node of a class loader graph that is unique, within the class loader graph, to that node.

As defined herein, the term "unique dependency identifier" means an identifier assigned to a node of a class loader graph that is determined based on one or more types of edges that terminate at the node. A plurality of nodes of different class loader graphs can be assigned the same unique dependency identifier.

As defined herein, the term "responsive to" means responding or reacting readily to an action or event. Thus, if a second action is performed "responsive to" a first action, there is a causal relationship between an occurrence of the first action and an occurrence of the second action, and the term "responsive to" indicates such causal relationship.

As defined herein, the term "computer readable storage medium" means a storage medium that contains or stores program code for use by or in connection with an instruction execution system, apparatus, or device. As defined herein, a "computer readable storage medium" is not a transitory, propagating signal per se.

As defined herein, the term "processor" means at least one hardware circuit (e.g., an integrated circuit) configured to carry out instructions contained in program code. Examples of a processor include, but are not limited to, a central processing unit (CPU), an array processor, a vector processor, a digital signal processor (DSP), a field-programmable gate array (FPGA), a programmable logic array (PLA), an application specific integrated circuit (ASIC), programmable logic circuitry, and a controller.

As defined herein, the term "automatically" means without user intervention.

Figure 2:
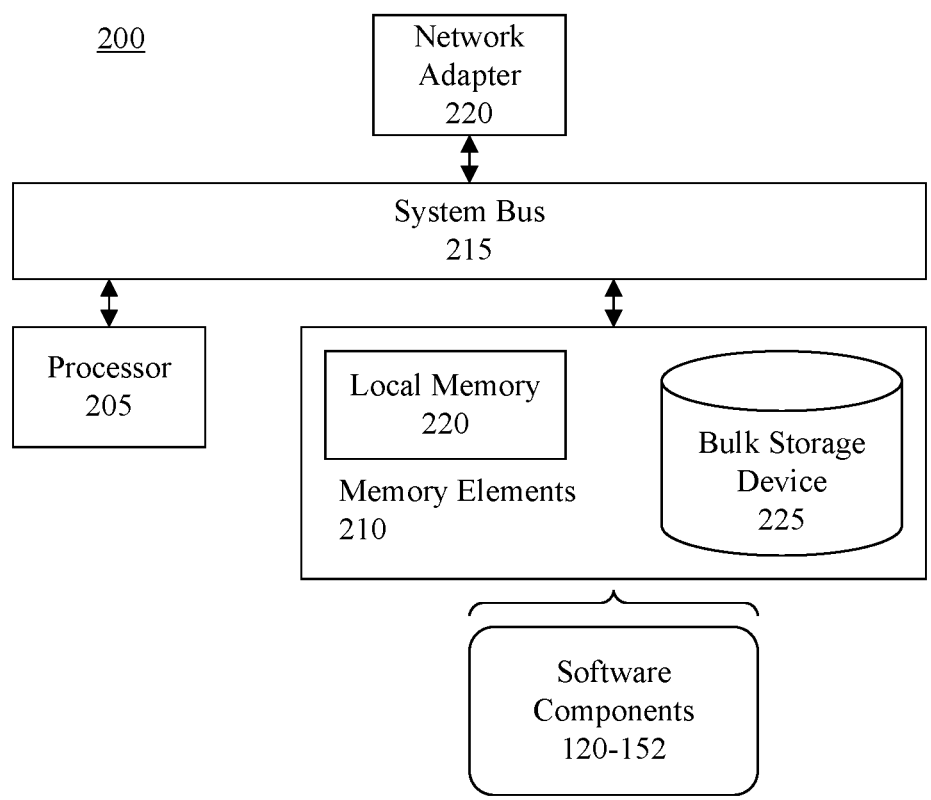
FIG. 2 is a block diagram illustrating example architecture for a data processing system.

FIG. 1 is a block diagram illustrating example architecture for a system 100 that hosts a multi-tenant virtual environment. The architecture can include computer hardware 110, such as a data processing system. FIG. 2 is a block diagram illustrating example architecture for the data processing system 200. The data processing system 200 can include at least one processor 205 (e.g., a central processing unit) coupled to memory elements 210 through a system bus 215 or other suitable circuitry. As such, the data processing system 200 can store program code within the memory elements 210. The processor 205 can execute the program code accessed from the memory elements 210 via the system bus 215. It should be appreciated that the data processing system 200 can be implemented in the form of any system including a processor and memory that is capable of performing the functions and/or operations described within this specification. For example, the data processing system 200 can be implemented as one or more hardware servers.

The memory elements 210 can include one or more physical memory devices such as, for example, local memory 220 and one or more bulk storage devices 225. Local memory 220 refers to random access memory (RAM) or other non-persistent memory device(s) generally used during actual execution of the program code. The bulk storage device(s) 225 can be implemented as a hard disk drive (HDD), solid state drive (SSD), or other persistent data storage device. The data processing system 200 also can include one or more cache memories (not shown) that provide temporary storage of at least some program code in order to reduce the number of times program code must be retrieved from the bulk storage device 225 during execution.

One or more network adapters 230 also can be coupled to data processing system 200 to enable the data processing system 200 to become coupled to other systems, computer systems, remote printers, and/or remote storage devices through intervening private or public networks. Modems, cable modems, transceivers, and Ethernet cards are examples of different types of network adapters 230 that can be used with the data processing system 400.

As pictured in FIG. 2, the memory elements 210 can store software components 120, 130, 132, 134, 140, 142, 144, 150, 152 of the system 100 of FIG. 1, which will be described. Being implemented in the form of executable program code, these software components 120-152 of the system 100 can be executed by the data processing system 200 and, as such, can be considered part of the data processing system 200.

Referring again to FIG. 1, an operating system 120 can be installed on, and executed by, the computer hardware 110. A multi-tenant JVM 130 also can be installed on, and executed by the computer hardware 110. More particularly, the multi-tenant JVM 130 can execute within a computing environment provided by the operating system 120. The multi-tenant JVM 130 can include a JVM application program interface (API) 132. The multi-tenant JVM 130 also can include a module registry 134 (e.g., a bundle registry) which tracks loaded modules. In this regard, a plurality of tenants 140-1, 140-2, 140-n can be installed on, and executed by, the computer hardware 110. Specifically, the tenants 140 can be executed by the multi-tenant JVM 130. The multi-tenant JVM 130 can provide a layer of abstraction between the tenants 140 and the computer hardware 110. For example, the multi-tenant JVM 130 can interpret compiled bytecode of the tenants 140 for the computer hardware 110 so that the computer hardware 110 can execute the tenants 140, even though the tenants 140 may not be specifically configured to execute on that particular computer hardware 110.

Each respective tenant 140-1, 140-2, 140-n can include a plurality of modules 142-1, 142-2, 142-n configured to perform certain operations of the tenant 140, thereby providing specific functionality for the tenant 140. The modules 142 can be, for example, OSGi bundles. In this regard, an OSGi Framework, including an OSGi Framework API 152, can be installed on, and executed by, the computer hardware 110. Specifically, a respective instance 150-1, 150-2, 150-n of the OSGi framework can be instantiated for each of the tenants 140-1, 140-2, 140-n. For example, each instance 150-1, 150-2, 150-n of the OSGi framework can run within a respective tenant 140-1, 140-2, 140-n. Each OSGi framework instance 150-1, 150-2, 150-n can contain a class loader graph corresponding to its respective tenant 140-1, 140-2, 140-n.

As noted, each OSGi bundle includes a set of one or more classes, class related resources, and services that give the class(es) specific behaviors when executed by the tenant 140. In addition to program code, each module 142 can include metadata that describes the capabilities provided by the module 142 and capabilities required by the module 142. For example, each module 142 can indicate which classes (e.g., Java packages) are required to fulfill dependencies needed in the module 142 and indicate which classes contained in the module 142 will be made available to other modules 142. These class dependencies and availabilities for each tenant 140 are represented in a respective class loader graph. In illustration, the modules 142 can include class loader requests configured to, when processed, call class loaders 144 which load classes required by the modules 142. When a particular module 142 requires a class to be loaded, a class loader 144 can be dynamically created for that module 142 to import certain packages containing classes from one or more other modules 142, or access all packages containing classes exported by one or more other modules 142. The class loader 144 can import classes by sending a request to the JVM API 132, which in turn can send a corresponding request to the OSGi framework API 152.

In accordance with the arrangements described herein, one or more class loaders 144, and the classes they load, can be shared across multiple tenants 140. Thus, if a required class loader already exists, that class loader need not be re-created. In this regard, each shared class loader 144 can be configured to be called by a plurality of the tenants 140 to load one or more classes that are required by the tenants 140. By way of example, a bundle object representing the shared class loader 144 can be created, and this bundle object can be configured to be called by modules 142 of different tenants 140 registered with the class loader 144. The module registry 134 can track class loaders 144 which are assigned to be shared class loaders.

Permissions, resources and uniform resource locator (URL) handlers can be assigned to the bundle object. For example, a shared class loader 144 can be dynamically configured to return tenant specific values to each of the tenants 140 registered with the shared class loader 144 responsive to the shared class loader 144 being called to load classes. For example, responsive to a first tenant 140 calling the shared class loader 144, values generated by the called classes that are specific to the first tenant 140 can be returned to the first tenant 140, but not to other tenants 140. Similarly, responsive to a second tenant 140 calling the shared class loader 144, values generated by the called classes that are specific to the second tenant 140 can be returned to the second tenant 140, but not to other tenants 140. In this regard, each tenant can have its own copy of writeable static fields for the classes that are loaded.

In illustration, permissions (e.g., Java permissions) can be assigned to each bundle 146 as the class(es) of the bundle 146 is/are being defined by the shared class loader 144, and the permissions can be associated with a protection domain. In this regard, protection domains used for the shared class loader 144 can be multiplexed. In other words, more than one protection domain can be assigned to the shared class loader 144, and the shared class loader 144 can select which protection domain to implement when loading classes for a module 142 based on the tenant 140 that is calling the class loader 144. For example, one set of permissions can be assigned to a class when it is accessed by a first tenant 140, and another set of permissions can be assigned to the class when the class is accessed by another tenant 140.

Each package request generated by a module 142 can include a unique dependency identifier (UDI) corresponding to a particular class loader 144 that is required to load requested packages, as well as parameters required by the module 142 for that class loader 144. As noted, the JVM API 132 can process the request and send a corresponding request to the OSGi framework API 152. The OSGi framework API 152 can access the module registry 134 to determine whether a class loader 144 assigned that UDI already exists. If a class loader 144 assigned the UDI already exists (e.g., the class loader 144 already has been created for use by a module 142 of another tenant 140, and that other tenant 140 has registered with the class loader 144), the OSGi framework API 152 can register the tenant 140 with the existing class loader 144. Since more than one tenant 140 now is registered with the class loader 144, that class loader 144 can be considered a shared class loader 144 and the OSGi framework API 152 can create a bundle object for the class loader 144. If a class loader 144 assigned the UDI does not already exist, the OSGi framework API 152 can create the class loader 144, based on the required parameters, and assign the specified UDI to that class loader 144. Thus, other tenants 140 that provide a request including that same UDI can be registered with the class loader 144, at which point the class loader 144 will be considered a shared class loader 144.

Figure 3:
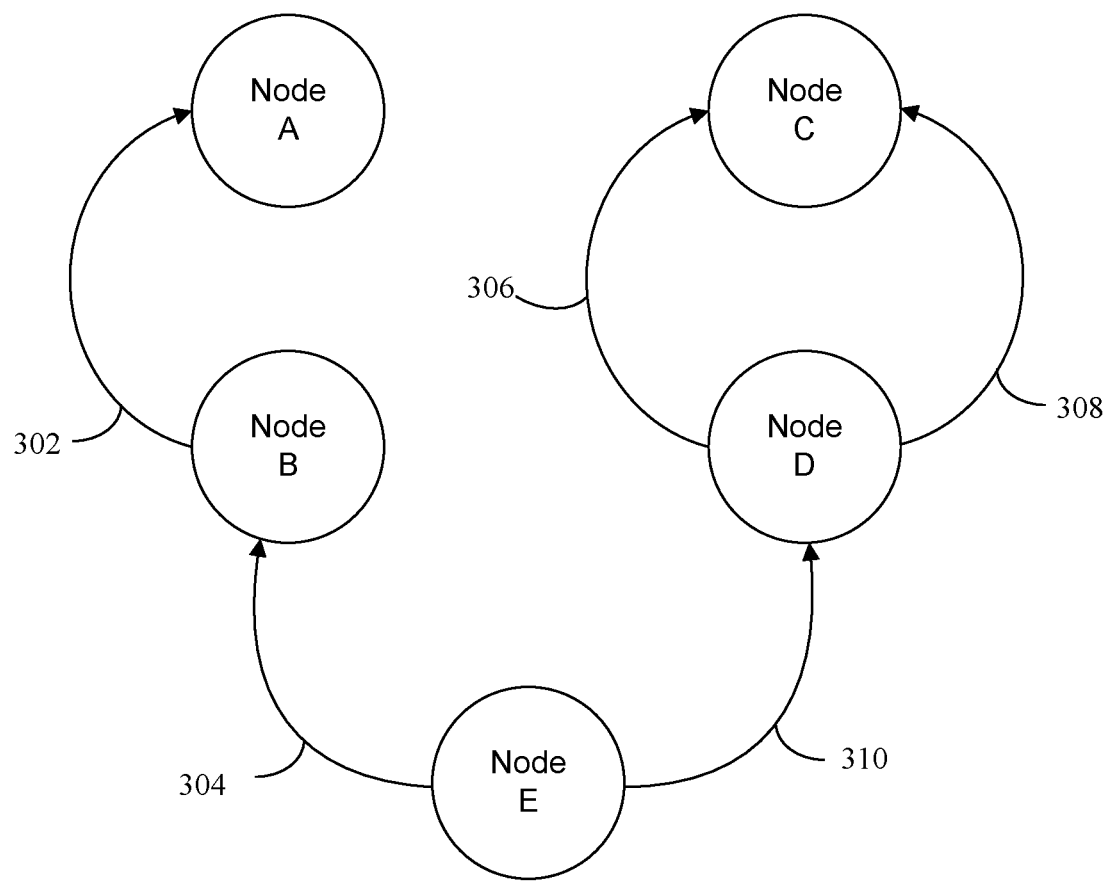
FIG. 3 is a pictorial representation of an example of a class loader graph.

The UDI assigned to a class loader 144 can be automatically generated based on an analysis of a class loader graph generated for a tenant 140 calling the class loader 144. FIG. 3 is a pictorial representation of an example of a class loader graph 300. The class loader graph 300 can be constructed in the computer hardware 110, for example within the memory elements 210 of FIG. 2. The class loader graph 300 can represent the use of class loaders 144 by the various modules 142 of the tenant 140. As noted, each tenant 140 can have its own instance 150 of the OSGi Framework which contains a class loader graph 300 for that tenant 140.

In this simple example, the class loaders 144 used by a particular tenant 140 are represented as nodes A, B, C, D and E. The tenant 140 (e.g., the OSGi framework instance 150 for that tenant 140) can assign to each node A-E a unique node identifier (UNI). The UNI assigned to each node is unique to that node in that particular class loader graph 300 (i.e., unique with respect to a particular tenant 140). It is anticipated, however, that other tenants 140 may require one or more class loaders 144 that perform the same functionality of one or more class loaders 144 represented by the nodes A-E. Accordingly, one or more nodes in their respective class loader graphs may be assigned the same UNI as one or more nodes in the class loader graph 300. For example, in one aspect, the UNI assigned to each respective node A-E can be generated using a secure hash algorithm (SHA), such as a SHA-256, over the bytes of data of the module (e.g., bundle) for which the class loader 144 is called. The UNI can be generated based on, not only the number of bytes of data used in the calculation, but also the manner in which those bytes of data are arranged. Thus, the UNI is assigned to a particular ordered sequence of data, and is unique to that particular ordered sequence. If another node in another class loader graph has the same bytes of data, and those data bytes are arranged in the same manner, that node will be assigned the same UNI. That being said, the present arrangements are not limited to the use of the SHA-256 algorithm. Indeed, any other algorithm that generates a consistent UNI for a given set of data bytes, and does not generate that same UNI for a set of data bytes having different values and/or a different sequence, may be used.

As noted, each module 142 can include metadata that describes the capabilities provided by the module 142 and the capabilities required by the module 142. The capabilities provided by each module 142 can include, for instance, an indication of classes exported by the module 142. The capabilities required by each module 142 can include, for instance, an indication of classes (e.g., one or more classes exported by one or more other modules) that are expected to be used (e.g., imported and/or accessed) by the module 142. Based on the metadata, the OSGi framework instance 150 for the respective tenant 140 can resolve interdependencies among the class loaders 144 by creating, in the class loader graph 300, edges 302, 304, 306, 308, 310 representing the interdependencies. Each edge can extend from a node to another node upon that node depends. For example, edge 302 can extend from node B to node A, edge 304 can extend from node E to node B, etc. Further, each edge 302-310 can be unique in the particular class loader graph 300. In this regard, each edge 302-310 can indicate a type of operation that affects class loading for a respective the node B, D, E from which the edge 302-310 extends. For example, in OSGi, an edge can indicate an operation requiring a particular bundle, requiring a particular import package, requiring a particular fragment of a bundle, and so on. It should be noted that, as with the nodes A-E, one or more of the edges 302-310 may be the same as edges representing interdependencies in class loader graphs created for other tenants 140.

In some cases, there may a single edge between two respective nodes. For example, there may be a single edge 302 between nodes B and A representing a single bundle requested by node B. In other cases, there may be multiple edges between two respective nodes. For example, there may be an edge 306 between nodes D and C representing a required import package and an edge 308 representing a required fragment. Moreover, a particular node may be dependent on more than one other node. Hence, one or more edges can extend from that node to each of the nodes on which the node is dependent. For example, if node E is dependent on nodes B and D, an edge 304 can extend from node E to node B, and an edge 310 can extend from node E to node D.

Based on the edges that extend from each node, the class loader 144 represented by that node can be assigned a UDI, and thus the UDI can be assigned to the class loader request represented by that node. For example, the UDI can be assigned to the module 142 of the tenant 140 that specifies the class loader request.

The UDI assigned to each node A-E can be generated by the tenant 140 (e.g., the OSGi framework instance 150 for that tenant 140). In illustration, the tenant 140 can traverse a path along edges 302-308 in the class loader graph 300 that lead away from a respective node, and calculate the UDI based on other nodes that are traversed following the edges 302-308, as well as the types of edges 302-310 that are traversed. For example, to generate a UDI for node B, the edge 302 extending from node B to node A can be traversed. Since node B is dependent on node A, and node A is not dependent on any other node, the UDI calculated for node B can be calculated based on the UNI of node A and the type of the edge 302. For example, an SHA-256 algorithm can be applied to the UNI and bytes of data associated with the edge 302. The bytes of data associated with the edge 302 can include, for example, bytes of metadata that defines the edge 302. Again, the present arrangements are not limited to the use of the SHA-256 algorithm. Indeed, any other algorithm that generates a consistent UDI for a given set of data bytes, and does not generate that same UDI for a set of data bytes having different values and/or a different sequence, may be used.

To generate a UDI for node E, edge 304 can be traversed from node E to arrive at node B, and edge 302 can be traversed to arrive at node A. Further, edge 310 can be traversed from node E to arrive at node D, and edges 306, 308 can be traversed to arrive at node C. Based on the UNI assigned to each of the nodes A-D, to which the respective edges 302-310 extend, and the edge type of each of the edges 302-310, the UDI for node E can be calculated.

Because class loaders 144 for nodes A and C do not depend from any other class loaders 144, the UDIs assigned to nodes A and C need only be based on their respective UNIs.

The UDI assigned to each node D, E may be affected by the order in which the edges 302-310 are traversed. Thus, measures can be taken to ensure that the order in which edges 302-310 are traversed for each tenant 140 are consistent with the order in which edges are traversed for other tenants 140. Thus, the UDI assigned to the nodes of the class loader graph 300 for each tenant 140 can be reliably compared to the UDIs assigned to the nodes of other tenants 140.

In one example, the edges can be traversed in an order indicated by the metadata associated within each node A-E. For example, the metadata can include a list of required packages, bundles, fragments, etc., and the edges 302-310 can be traversed in the order in which these objects are specified.

In another example, the order in which the edges 302-310 are traversed can be based on their edge types. For instance, in an arrangement in which a plurality of edges extend from a particular node, the edges extending from that node can be sorted based on the type of each edge, and the UDI can be calculated for each node A-E by processing the bytes of data associated with each edge in the order in which the edges are sorted.

In another example, the edges can be traversed in a depth first order or in a breadth first order. In illustration, for a depth first order, edge 304 can be traversed first, edge 302 can be traversed second, edge 310 can be traversed third, edge 306 can be traversed fourth, and edge 308 can be traversed fifth. For a breadth first order, edge 304 can be traversed first, edge 310 can be traversed second, edge 302 can be traversed third, edge 306 can be traversed fourth, and edge 308 can be traversed fifth.

At this point it should be noted that nodes which are dependent on a particular node, and edges leading to the particular node from the dependent nodes, need not be considered when calculating the UDI for that particular node. For example, when calculating the UDI for node B, only node A and edge 302 need be considered. Similarly, when calculating the UDI for node D, only node C and edges 306, 308 need be considered. Thus, if a class loader graph for another tenant 140 includes nodes A-D, but in lieu of, or in addition to, node E, that other class loader graph includes some other node(s) as that depend on nodes B, D, the nodes in that other class loader graph that correspond to nodes B, D can be assigned the same UDIs as nodes B, D, respectively. In this regard, the determination of whether a particular class loader 144 can be shared among multiple tenants 140 need not be dependent on what other class loaders 144 depend on that class loader 144, but instead can be dependent on the operations performed by that class loader 144 and other class loaders 144 on which the particular class loader 144 is dependent.

When a particular tenant 140 requires a class loader 144, the module 142 calling the class loader 144 using a class loader request can indicate the parameters of the class loader 144 and the UDI calculated for the class loader 144. For example, when the tenant 140 for which the class loader graph 300 is created requires a class loader 144 represented by node E, the module that calls the required class loader 144 can send a class loader request (e.g., as a GetBundle request) to the JVM API 132. The class loader request can include the parameters of the class loader 144 represented by node E, as well as the UDI assigned to node E. If a class loader 144 assigned the same UDI has already been created, the tenant 140 can register with that class loader 144 and the class loader 144 can be shared with the tenant 140. If a class loader 144 assigned the same UDI has not already been created, that class loader 144 can be created, and the tenant 140 can register with the class loader 144. If one or more other tenants 140 send a class loader request specifying that same UDI, rather than creating the class loader 144, the class loader 144 that has been created can be shared with such other tenant(s) 140, and such tenant(s) 140 can register with the shared class loader 144. Thus, if different tenants 140 require the same class loader 144, rather than recreating the class loader 144 for each tenant 140, one class loader 144 can be created and shared among the tenants 140 that require that class loader 144. This greatly improves operating efficiency of the processing system hosting the plurality of tenants 140; less memory space is required to execute the plurality of tenants 140, less processor resources are used since a fewer number of class loaders 144 are created, etc.

In one arrangement, rather than creating a class loader 144 the first time the class loader 144 is required during execution of a tenant 140, the class loaders 144 can be created ahead of time, for example responsive to a class loader graph being resolved for a first tenant 140 that requires that class loader 144. Moreover, if a class loader 144 is created for a first tenant 140, and a class loader graph is resolved for another tenant 140 that requires the same class loader 144, the other tenant 140 can pre-register with the class loader 144 when resolving its respective class loader graph. For example, such operations can be performed when the tenants 140 are installed. This mitigates the use of processor resources to perform the class loader creation/registration operations when the tenants 140 are actually executing. If a tenant 140 is uninstalled or reconfigured so that the tenant 140 no longer needs use of a shared class loader 144, the tenant 140 can unregister itself with that class loader 144. The shared class loader 144 can be reconfigured accordingly.

Static initializers can be considered with respect the sharing of class loaders 144. When a class is loaded by a class loader 144, static initializers may perform other tasks. Such tasks can be limited to tasks that are required by the particular tenant 140 for which the class is loaded. When another tenant accesses the class, however, the static initializers can again be run for that other tenant. In one arrangement, when a class is accessed by a tenant 140 using a shared class loader 144, a notification can be communicated to all tenants 140 pre-registered with the shared class loader 144 indicating that the class has been accessed. Thus, the other tenants 140 are given notice to run the static initializers when the other tenants 140 call the shared class loader 144 to load the corresponding class.

FIG. 4 is a flow chart 400 illustrating an example of a method of sharing of classes for tenants executing in a multi-tenant virtual environment. At step 402, for each of a plurality of different tenants configured to concurrently execute in a virtual environment, a respective class loader graph can be constructed in memory of a processing system. Each class loader graph can comprise a plurality of nodes, each node representing a respective class loader request specified by a module of the respective tenant. Each class loader graph can be constructed by the respective tenant for which the class loader represents class loading operations and/or by the OSGi framework.

At step 404, for each respective class loader graph, unique types of edges between nodes that affect class loading can be identified. Each edge can extend from a respective first node to a respective second node and indicate a dependency of the class loader request represented by the first node on the class loader request represented by the second node. The edges in the class loader can be traversed in accordance with data, for example metadata, associated with each node. Based on traversing the edges of the class loader graph, a respective UDI can be assigned to each class loader request represented by a corresponding node. The respective UDI assigned to a class loader request that is dependent on at least one other class loader request can be based, at least in part, on a respective type of at least one edge extending from the first node representing the class loader request to the second node representing the other class loader request. The respective UDIs assigned to a class loader request that is dependent on at least one other class loader request also can be based on a UNI assigned to the second node representing the other class loader request.

At step 406, class loader requests that are assigned the same UDI can be identified in at least two of the plurality of tenants. Such class loader requests can be identified as the tenants are installed, or as the tenants call the shared class loader, for example as previously described. At step 408, responsive to identifying the class loader requests that are assigned the same UDI, a shared class loader can be assigned to each of the class loader requests using a processor. At step 410, each respective class loader request that is assigned the same UDI can be configured to call the shared class loader to load at least one class required by the respective tenant.

For purposes of simplicity and clarity of illustration, elements shown in the figures have not necessarily been drawn to scale. For example, the dimensions of some of the elements may be exaggerated relative to other elements for clarity. Further, where considered appropriate, reference numbers are repeated among the figures to indicate corresponding, analogous, or like features.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The terminology used herein is for the purpose of describing particular embodiments only and is not intended to be limiting of the invention. As used herein, the singular forms "a," "an," and "the" are intended to include the plural forms as well, unless the context clearly indicates otherwise. It will be further understood that the terms "includes," "including," "comprises," and/or "comprising," when used in this disclosure, specify the presence of stated features, integers, steps, operations, elements, and/or components, but do not preclude the presence or addition of one or more other features, integers, steps, operations, elements, components, and/or groups thereof.

Reference throughout this disclosure to "one embodiment," "an embodiment," or similar language means that a particular feature, structure, or characteristic described in connection with the embodiment is included in at least one embodiment described within this disclosure. Thus, appearances of the phrases "in one embodiment," "in an embodiment," and similar language throughout this disclosure may, but do not necessarily, all refer to the same embodiment.

The term "plurality," as used herein, is defined as two or more than two. The term "another," as used herein, is defined as at least a second or more. The term "coupled," as used herein, is defined as connected, whether directly without any intervening elements or indirectly with one or more intervening elements, unless otherwise indicated. Two elements also can be coupled mechanically, electrically, or communicatively linked through a communication channel, pathway, network, or system. The term "and/or" as used herein refers to and encompasses any and all possible combinations of one or more of the associated listed items. It will also be understood that, although the terms first, second, etc. may be used herein to describe various elements, these elements should not be limited by these terms, as these terms are only used to distinguish one element from another unless stated otherwise or the context indicates otherwise.

The term "if" may be construed to mean "when" or "upon" or "in response to determining" or "in response to detecting," depending on the context. Similarly, the phrase "if it is determined" or "if [a stated condition or event] is detected" may be construed to mean "upon determining" or "in response to determining" or "upon detecting [the stated condition or event]" or "in response to detecting [the stated condition or event]," depending on the context.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A method, comprising:
   for each of a plurality of different tenants configured to concurrently execute in a virtual environment, constructing in a memory of a processing system a respective class loader graph comprising a plurality of nodes, each node representing a respective class loader request specified by a module of the tenant;
   for each respective class loader graph:
      identifying unique types of edges between nodes that affect class loading, wherein each edge indicates a dependency of the class loader request represented by a first node on the class loader request represented by a second node;
      traversing the edges in the class loader graph in accordance with data associated with each node; and
      based on traversing the edges of the class loader graph, assigning a unique dependency identifier to each class loader request represented by a corresponding node;
   identifying, in at least two of the plurality of tenants, class loader requests that are assigned the same unique dependency identifier;
   responsive to identifying the class loader requests to which the same unique dependency identifier is assigned, assigning, using a processor, a shared class loader to each of the class loader requests; and
   configuring each respective class loader request to which the same unique dependency identifier is assigned to call the shared class loader to load at least one class required by the respective tenant.

2. The method of claim 1, wherein the respective unique dependency identifier assigned to the class loader request that is dependent on at least one other class loader request is based, at least in part, on a unique node identifier assigned to the second node representing the other class loader request.

3. The method of claim 1, wherein the tenant for which the respective class loader graph is constructed performs the steps of constructing in the memory of the processing system the respective class loader graph comprising the plurality of nodes, identifying unique types of edges between nodes that affect class loading, traversing the edges in the class loader graph in accordance with data associated with each node, and assigning to the class loader request, represented by the corresponding node, the respective unique dependency identifier.

4. The method of claim 1, further comprising:
   responsive to receiving the class loader request indicating the unique dependency identifier, determining whether a class loader to which the unique dependency identifier is assigned already exists;
   responsive to determining that the class loader to which the unique dependency identifier is assigned already exists, assigning the class loader to be the shared class loader; and
   registering the tenant for which the class loader request is generated with the shared class loader.

5. The method of claim 1, further comprising:
   responsive to receiving a class loader request indicating the unique dependency identifier, determining whether a class loader to which the unique dependency identifier is assigned already exists;
   responsive to determining that the class loader to which the unique dependency identifier is assigned does not already exist, creating the class loader and assigning to the class loader the unique dependency identifier; and
   registering the tenant for which the class loader request is generated with the created class loader.

6. The method of claim 1, wherein configuring each respective class loader request to which the same unique dependency identifier is assigned to call the shared class loader to load at least one class required by the respective tenant comprises:
   pre-registering the respective tenant with the shared class loader, the respective tenant pre-registering with the shared class loader prior to the shared class loader being called on behalf of the respective tenant during execution of the respective tenant.

7. The method of claim 1, further comprising:
dynamically configuring the shared class loader to, responsive to loading at least one corresponding class, return tenant specific values generated by at least one class loaded by the shared class loader to the tenant that calls the shared class loader.

\* \* \* \* \*